United States Patent

[11] 3,585,592

[72] Inventors Kazuo Kiji;
Yukio Hoshino, both of Tokyo, Japan
[21] Appl. No. 800,224
[22] Filed Feb. 18, 1969
[45] Patented June 15, 1971
[73] Assignee Nippon Electric Company, Limited
Tokyo, Japan
[32] Priority Feb. 29, 1968
[33] Japan
[31] 43/13062

[54] CHARACTER RECOGNITION SYSTEM WITH CHARACTER EDGE DETECTION CAPABILITY
12 Claims, 13 Drawing Figs.

[52] U.S. Cl. 340/146.3AC
[51] Int. Cl. G06k 9/10
[50] Field of Search 340/146.3

[56] References Cited

UNITED STATES PATENTS 3,177,469 4/1965 Chow 340/146.3
3,178,688 4/1965 Hill et al. 340/146.3

*Primary Examiner*—Maynard R. Wilbur
*Assistant Examiner*—Leo H. Boudreau
*Attorney*—Marn and Jangarathis ABSTRACT: A system for recognizing and reproducing a preselected numerical character formed in ink on a transparent background, including: optical conversion of background and ink portions of the character into "0" and "1" signals, respectively, which are stored in a pattern in a shift register; logic means utilizing the "0" and "1" shift register stored signals row-by-row to produce signals representing particular features of successively scanned segments of the ink; discriminating circuit means selectively energizing certain circuits thereof representing typical segments of a known character corresponding to the scanned character in response to the particular feature signals; and receiving means activated by the selectively energized discrimination circuit means at the end of the utilization of the stored "0" and "1" signals to reproduce the scanned character in terms of the "0" and "1" signal pattern stored in the shift register.

INVENTORS
Kazuo Kiji
Yukio Hoshino
BY
Marn & Jangarathis
ATTORNEYS

INVENTORS
Kazuo Kiji
Yukio Hoshino
BY
Marn & Jangarathis
ATTORNEYS

INVENTORS
Kazuo Kiji
Yukio Hoshino
BY
Marn & Jangarathis
ATTORNEYS

INVENTORS
Kazuo Kiji
Yukio Hoshino

BY
Marn & Jangarathis
ATTORNEYS

INVENTORS
Kazuo Kiji
Yukio Hoshino
BY
Marn & Jangarathis
ATTORNEYS

INVENTORS
Kazuo Kiji
Yukio Hoshino
BY
Marn & Jangarathis
ATTORNEYS

INVENTORS
Kazuo Kiji
Yukio Hoshino
BY
Marn & Jangarathis
ATTORNEYS

CHARACTER RECOGNITION SYSTEM WITH CHARACTER EDGE DETECTION CAPABILITY

This invention relates to a system for recognizing and reproducing characters, and more specifically to such system for recognizing and reproducing both printed and handwritten numeral characters.

Systems for recognizing and reproducing discrete numerical characters are heretofore known in the art. Each of such systems is designed to recognize a particular type of numerical character whose formation differs from one system to another. As a consequence, it was found that such prior-art systems were incompatible in the respect that each could not satisfactorily recognize and reproduce a range of differently formed numerical characters encompassing those of the other systems. It was further found that the prior-art systems were incapable of recognizing and reproducing handwritten numerical characters. The reason for the incompatibility is that each prior-art system is limited to recognition of a specific type of numerical character having limited variations. It would therefore appear that the prior-art systems lacked compatibility for printed and handwritten numerical characters embodying numerous, different variations of formations.

The present invention concerns a system for recognizing and reproducing both printed and handwritten, numerical characters by extracting therefrom only such features that are essential to their recognition.

A principal object of the invention is to provide an improved system for recognizing and reproducing numerical characters.

Another object is to recognize and to reproduce printed, numerical characters embodying numerous variations of formation thereof.

A further object is to recognize and to reproduce handwritten, numerical characters including several variations of formation thereof.

An additional object is to recognize and reproduce both printed and handwritten, numerical characters having a variety of different characterizing features.

Still another object is to recognize and to reproduce both printed and handwritten numerical characters on the basis of distinguishing segmental features.

A still further object is to provide an economical system for recognizing and reproducing printed and handwritten characters.

A still additional object is to provide a facile system for recognizing and reproducing both printed and handwritten numerical characters.

A specific embodiment of the present invention for recognizing and reproducing a printed or a handwritten numerical character formed with a preselected color ink on a transparent background, comprises: optical means for scanning the character to produce a synchronizing signal and "0" and "1" signals to represent the background and ink portions respectively; a shift register including a plurality of discrete areas arranged in M rows and N columns, each area common to one row and one column, for storing the "0" and "1" signals in a pattern; scanning logic means activated by the synchronizing signal to produce a plurality of trains of scanning pulses of which each train includes certain pulses, equal in number to the number of areas in each register row, for simultaneously and bidirectionally scanning the areas in a bottom row of the shift register to secure the "0" to "1" and "1" to "0" transitions therein to produce output signals representing left-hand and right-hand edges of successively scanned ink segments and thereafter a last pulse in each pulse train for shifting down the "0" and "1" signals in the next-to-the-bottom register area row to replace the "0" and "1" signals then in the bottom register area row and at the same time shifting down the "0" and "1" signals stored in the remaining area rows by one area row at a time until all of the register area rows are successively scanned as the register bottom row to sense the "0" to "1" and "1" to "0" transitions therein; first counting logic means stimulated by the scanning means output signals representing the "0" to "1" transitions in the register bottom row as scanned in a preselected one direction of the bidirectional scanning and by the last timing pulses of the respective scanning pulse trains for producing different output signals representing different lengths of successive ink portions as determined by successive scannings of the register bottom row; feature extracting means actuated by the scanning means output signals and the first counting means different output signals for producing a plurality of output signals representing particular segmented features of the scanned character; discriminating circuit means including a plurality of discrete circuits identifying typical segments of a known numerical character and related to the particular segmental features of the scanned character and selectively energized by the feature extracting means output signals; second counting means counting the last timing pulses included in the successive timing pulse trains required to read out all of the "0" and "1" signals shifted into the register bottom row in accordance with the "0" and "1" signal register pattern for producing a recognition command pulse to activate the character discriminations means to read out the selectively energized circuits therein; and receiving means responsive to the last-mentioned selectively energized circuits as read out thereto for reproducing the scanned character in terms of the "0" and "1" signal pattern stored in the shift register.

The operation of the specific embodiment of the invention is now briefly explained. A numerical character in either printed or handwritten form is optically scanned to produce a video signal including a synchronizing pulse RECP which is further mentioned hereinafter. The video signal is then quantized into the "0" and "1" binary signals which are stored in the M-row and N-column shift register. In response to the synchronizing pulse, the register bottom row is simultaneously scanned in opposite directions to sense the "0" to "1" and the "1" to "0" transitions therein. The time intervals between the sensed transitions in successive scannings of the register bottom row are then measured to determine the lengths of the ink in corresponding segments of the scanned character. Combinations of the time sensed "0" to "1" and "1" to "0" transitions and the measured ink lengths identify such corresponding segments of the scanned numerical character. These segments are then individually recognized with reference to similar segments of a known character and thereafter read out to a receiving device which reproduces the scanned numerical character.

More particularly, the specific embodiment of the invention further operates in the following manner. The M-row and N-column shift register is electronically scanned simultaneously in opposite directions for the "0" to "1" and "1" to "0" signal transitions therein, starting at the left-hand and right-hand ends of the bottom row. Upon finishing the simultaneous scanning of the register bottom row, for example, the "0" and "1" signals of the second row from the bottom are shifted down into the bottom row to replace the "0" and "1" signals already in the bottom row while at the same time the "0" and "1" signals in the remaining register rows are simultaneously shifted down one row. Again, the simultaneously opposite—direction scanning is repeated for the new "0" to "1" and "1" to "0" signal transitions in the bottom row. This scanning of the bottom row is repeated until the remaining register rows are scanned in the same manner for the "0" to "1" and "1" to "0" signal transitions therein. During the bidirectional scanning of the successive register bottom rows, the "0" to "1" and "1" to "0" signal transitions therein are sensed, and the time intervals between the successive transitions are measured by use of a pulse counter. The results of the bidirectional scanning measurements indicate how long the ink (block) portion is in one row of the register and how the latter ink length is related to the length of the ink (block) portion in the next succeeding register bottom row. Combinations of measured lengths of ink portions and nonink portions relative to corresponding portions of a known similar numerical character provide the information necessary to identify the scanned numerical character.

Summarizing, the specific embodiment of the invention is characterized by the use of an M-row N-column matrix register, simultaneous bidirectional scanning of the register bottom row for the "0" to "1" and "1" to "0" transition signals stored therein, measurements of ink and nonink portions as indicated by the successively sensed register bottom row "0" and "1" signals, comparisons of the latter portions of the scanned character with reference to corresponding ink and nonink portions of a known, similar character enable the recognition of the scanned characters and a reproduction of the recognized scanned character.

The invention is readily understood from the following description taken together with the accompanying drawing in which.

Figure 1:
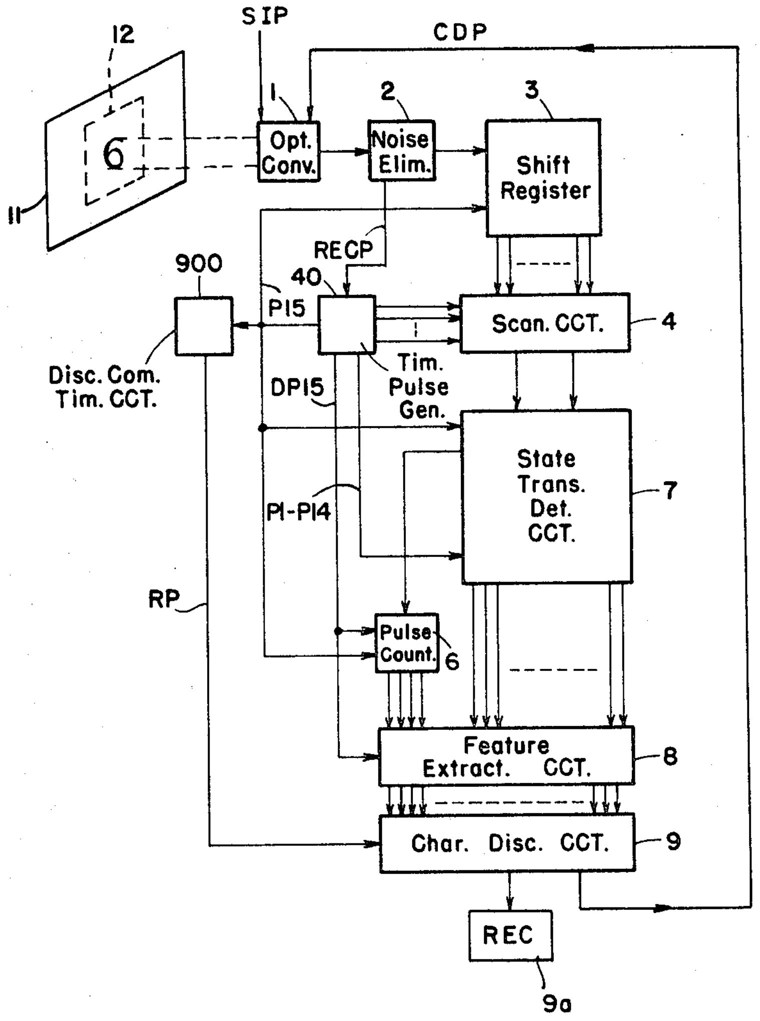
FIG. 1 is a block diagram of a character recognition system including a specific embodiment of the present invention.
Figure 5:
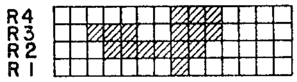
FIG. 5 is a partial representation of a shift register used in FIG. 1.
Figure 10:
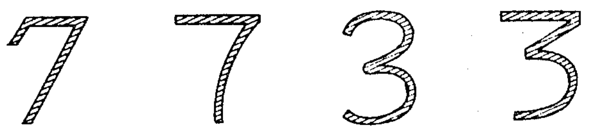
Figure 7:
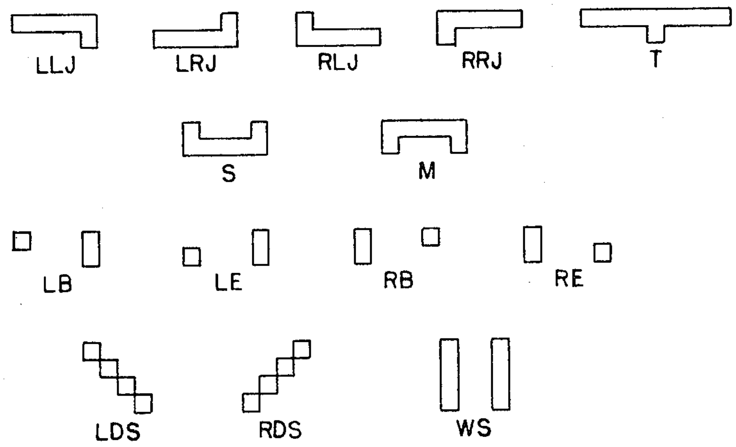
Figure 8:
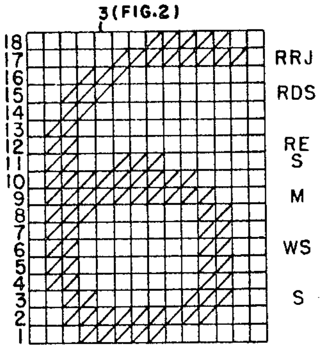
Figure 9:
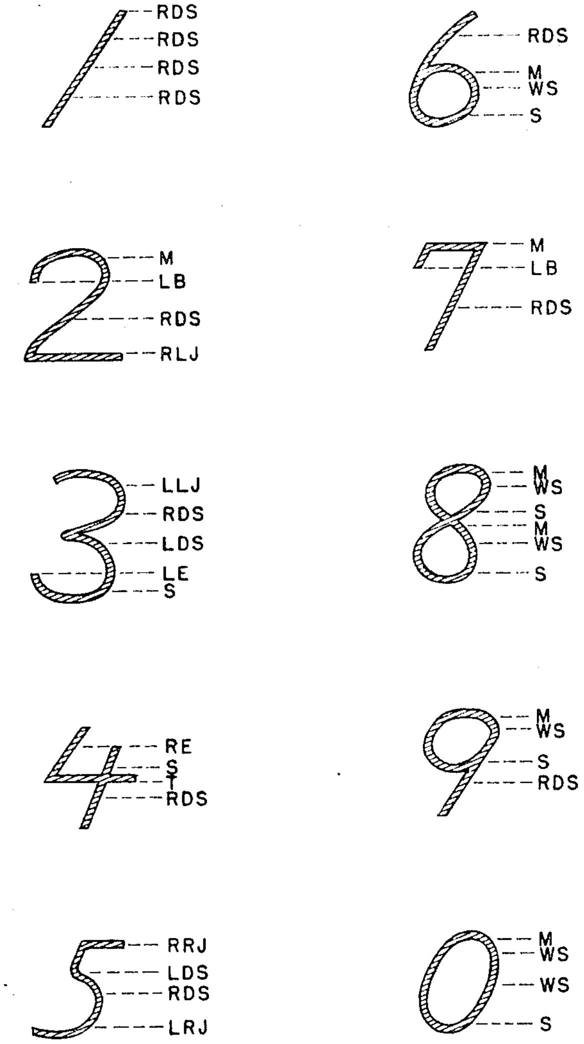

FIGS. 6*a* through 6*d* are block representations of results achieved in FIGS. 1 and 5;

FIG. 7 is a family of blocks showing discrete patterns of a character scanned in FIG. 1;

FIG. 8 represents an optically converted character stored in FIG. 1;

FIG. 9 shows typical features of printed and handwritten numerical characters that can be recognized and reproduced in FIG. 1; and FIG. 10 are forms of two numerical characters having different shapes and recognizable for reproduction in FIG. 1.

FIG. 1 shows a printed or handwritten character "6" formed with a preselected color ink, specifically black, on a colorless, transparent region 12 of a document 11 and converted by an optical scanner 1 into a video signal. This signal is supplied through a noise eliminating and character positioning circuit 2 for storage in an M-row and N-column matrix register 3 of familiar structure. A scanning initiation pulse SIP synchronized with the document 11 to initiate the scanning cycle and a character discrimination completion pulse CDP to scan another character are applied to the optical scanner 1 from a conventional means (not shown) and a character discriminating circuit 9 hereinafter mentioned, respectively. The noise eliminating circuit 2 produces a synchronizing pulse RECP to actuate a timing pulse source 40 as soon as one character is stored in the shift register 3 as binary signals "1" and "0". A timing pulse P15 from the timing source 40 is fed to the shift register 3 to effective activation thereof.

It is understood that the single line extending from the pulse source to the shift register represents a plurality of lines for enabling the shift register to shift signals in horizontal and vertical directions in the well-known manner. Upon the completion of the storage of one scanned numerical character in the shift register, bidirectional scanning is initiated in a scanning circuit 4 which is connected to the respective signal storage areas in the bottom row of the shift register. Each time the bidirectional scanning is completed for the shift register bottom row, the signal content later identified and stored in the next-to-the-bottom shift register row is shifted down to replace the signal content then stored in the shift register bottom row.

At the same time the signal contents of the remaining shift register rows are simultaneously shifted down one row in the shift register. Immediately after the simultaneous shifting of the signal contents down in the respective rows of the shift register as just mentioned, the bidirectional scanning of the register bottom row for the new signal contents therein is initiated. This procedure is repeated until the signal content initially stored in the top row of the shift register is shifted down into the bottom row which is thereupon scanned.

This bidirectional scanning produces a binary signal representing the length of the ink portion occupying at least a part of the bottom row of the shift register as scanned. More specifically, the latter binary signal represents the number of the unit register where stage "1" is stored for indicating the ink portion. Supplied with the output of scanning circuit 4, a state-transition-detection circuit 7 detects the time points of the "0" to "1" and "1" to "0" signal transitions. The mutual relationships between such transition time points as stored in one shift register bottom row at one time and those stored in the shift register bottom row in a next succeeding line are sensed in a feature extractor circuit 8. This circuit is activated by the outputs of the transition—detection circuit 7 and the outputs of a pulse counter 6 as representing the lengths of the ink portions in the respective rows of signals scanned as the shift register bottom row. The feature extractor circuit produces output signals representing particular segments of the scanned character. A character discriminating circuit 9 includes discrete circuits identifying segments of a known numerical character and related to the particular segments of the scanned character. These circuits selectively energized by feature extractor circuit output signals are read out by a recognition command pulse generated in a discriminator command timing circuit 900 into a receiver 9*a* suitable for reproducing the scanned character.

Figure 2:
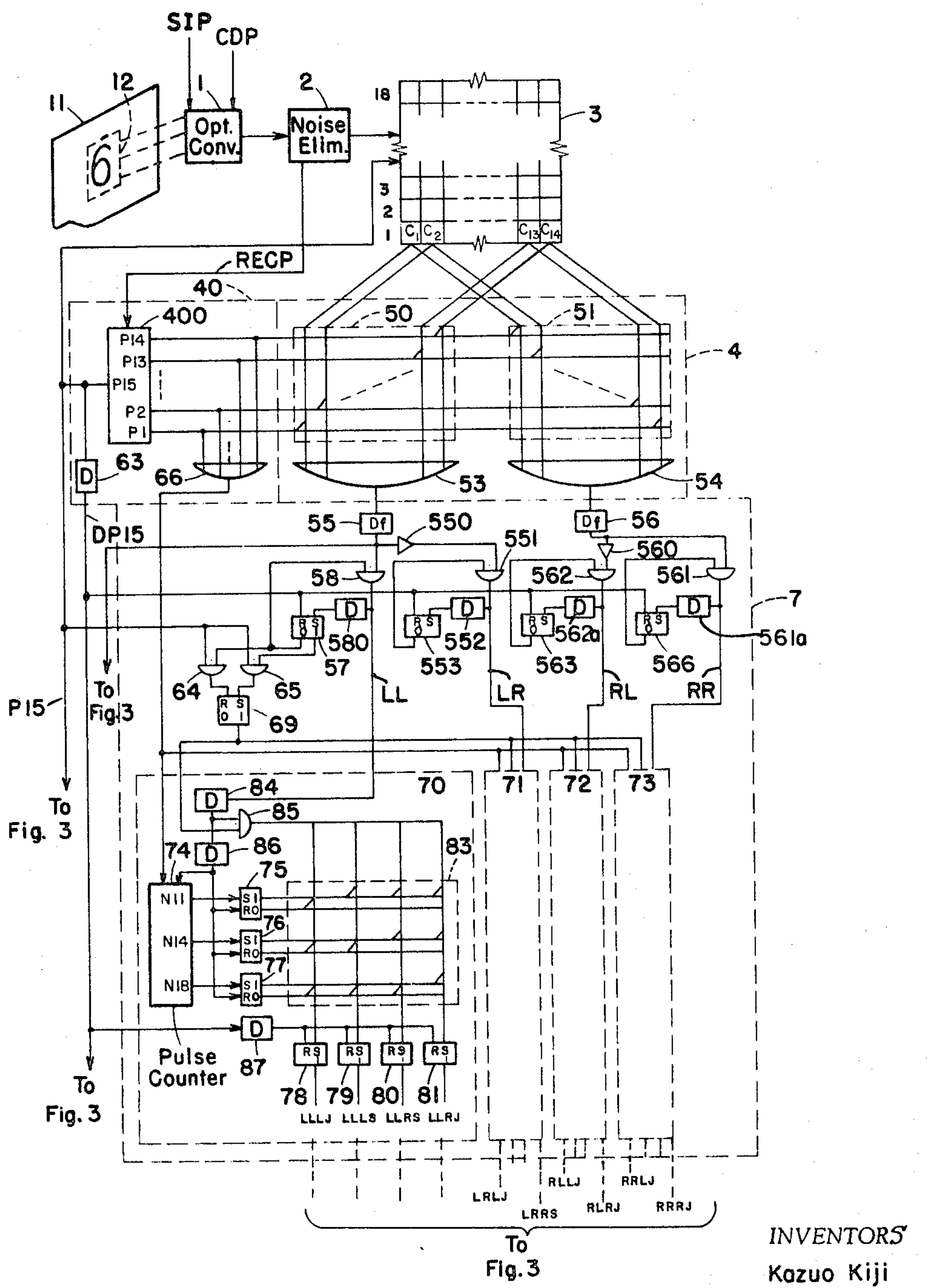
FIGS. 2 and 3 are separate circuit diagrams constituting certain blocks in FIG. 1.

FIG. 2 shows the optical converter 1 comprising, for example, a flying spot type of scanner of conventional structure for scanning the numerical character "6" to produce a video signal. This signal is applied to the noise eliminator 2 which produces a two-level normalized video signal including "0" and "1" levels, and a synchronizing signal RECP. In this two-level signal, the "0" and "1" signals represent the background 12 and the ink respectively, of the scanned character "6" to be scanned. These "0" and "1" signals are stored in the N-row M-column shift register 3 which, for example, may comprise the type disclosed in a Japanese Pat. application No. 64096/65 (Japan Pat. Publication No. 22732/67) filed by the applicant of the instant application.

Figure 4:
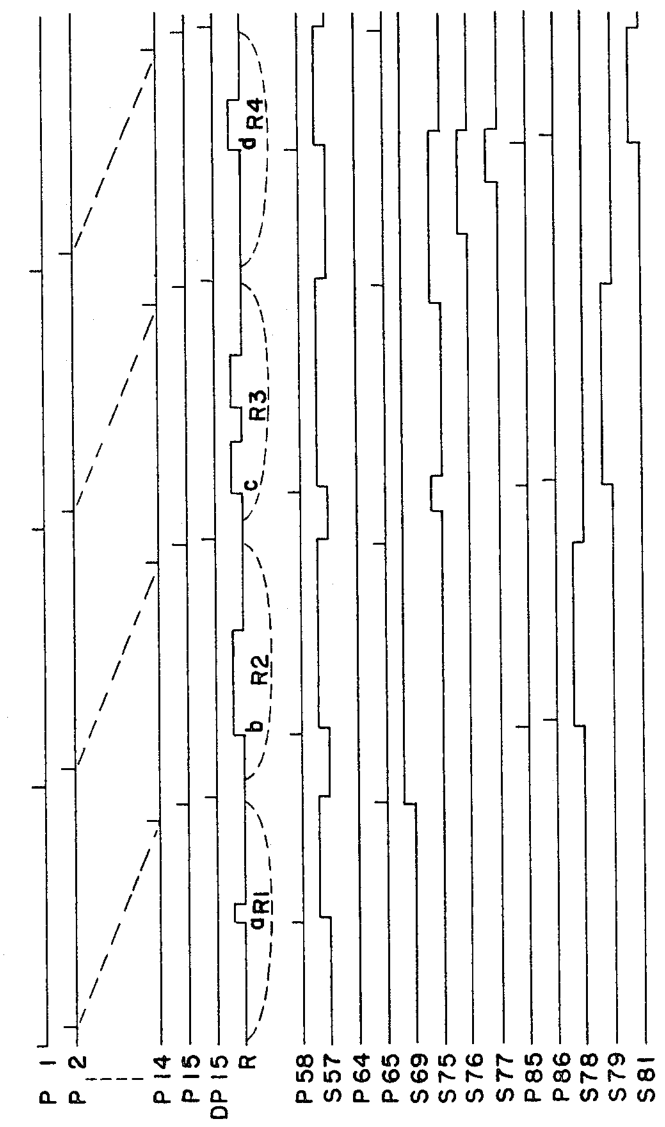
FIG. 4 is a family of waveforms illustrating action obtainable in FIG. 1.

The optical image of the scanned character "6" is thus stored in the shift register in the form of a "0" and "1" pattern. Upon each completion of the storage of the "0" and "1" binary signals in the shift register, the timing signal component RECP actuates the pulse generator 400 included in the pulse source 40 to produce a plurality of successive trains of scanning pulses at terminals, P1...P15, each train including pulses uniformly spaced in the time domain as shown in FIG. 4 for a purpose later explained. The 15th pulse of each pulse train serves as a timing pulse to shift the "0" and "1" signals in the next-to-the-bottom row down one row to replace the "0" and "1" signals in the then bottom row while at the same time shifting down the "0" and "1" signals in the remaining rows by one row at a time.

The pulses P1...P14 applied to corresponding horizontal parallel conductors included in diode matrices 50 and 51 serve to scan discrete areas C1...C14 constituting the bottom row of the shift register to sense the "0" to "1," "1" to "0" transitions stored therein for a purpose that is later explained. It is apparent that identical discrete areas C1...C14 form each of the remaining rows in the shift register as illustrated in FIG. 2. As hereinafter pointed out regarding FIG. 8, it is understood that the shift register comprises 18 horizontal rows. The shift register thus comprises 14 discrete storage areas disposed in each horizontal row and 18 horizontal rows stacked in such manner that each area is common to one row and one column. As indicated in FIG. 2 the uppermost ends of corresponding vertical parallel conductors in the respective matrices 50 and 51 are connected to the same area in the bottom row of the shift register. It is further evident in FIG. 2 that the diodes in matrix 50 connect the horizontal and vertical conductors thereof in such manner that the scanning pulses P1...P14 sense the storage areas C1...C14, respectively, in the bottom row of the shift register in the left-hand-to-right-hand direction, starting at area C1, whereas the diodes in matrix 51 connect the horizontal and vertical conductors thereof in such manner that the same scanning pulses P1...P14 sense the storage areas C1...C14, respectively, in the bottom row of the shift register in the right-hand-to-left-hand direction, starting at area C14. Therefore, the scanning pulses P1...P14 scan the storage areas C1...C14, respectively in opposite directions at the same time for a purpose that is below stated.

Also, as indicated in FIG. 2, the lowermost ends of the vertical conductors in matrices 50 and 51 are connected via OR gates 53 and 54, respectively to a state-transition-detecting or edge tracer circuit 7. The timing pulse P15 is applied through a delay line 63 which provides a time delay of one-third of the repetition period of the latter pulse as illustrated in FIG. 4 for a purpose which is subsequently stated. The scanning pulses P1...P14 are also supplied through OR gate 66 for a purpose that is hereinafter mentioned.

Referring to FIG. 2, the "0" and "1" binary signals stored in the bottom row of the shift register shown therein are converted via the scanning matrices 50 and 51 and OR gates 53 and 54 into a pair of time-serial binary signals. Upon completion of the scanning of the latter bottom row by pulses P1...P14, the pulse P15 in the same train with the latter pulses shifts the "0" and "1" signals stored in the next-to-bottom row down one row to replace the "0" and "1" signals stored in the remaining rows down one row. The use of successive trains of Scanning pulses P1...P15 in the same manner is repeated until the entire "0" and "1" pattern stored in the respective, remaining rows of the shift register to represent the numerical character "6" (FIG. 8, for example) is completely converted via the scanning matrices 50 and 51 and OR gates 53 and 54 into corresponding successive pairs of time—serial binary signals. Sensing of the complete conversion or reading out of the numerical character "6" is effected by counting 18 successive pulses P15 in a pulse counter 900 in a manner subsequently described. At this time, a document feeding mechanism (not shown) in FIGS. 1 and 2 is actuated in conventional manner in response to another 18 count of pulses P15 to dispose the next numerical character to be scanned in the proper position therefor in front of the optical converter 1.

The output signal of OR gate 53 is applied to the input of differentiating circuit 55. When the output of differentiating circuit 55 is changed in state from a "0" to "1" at an instant when flip-flop 57 having its set terminal connected via delay line 580 and AND gate 58 is in the reset state, then AND gate 58 produces a "1" signal on its output lead LL. The reference character LL indicates a "0" to "1" transition as sensed for the first time in a left-hand-to-right-hand direction in the bottom row of the shift register. The "1" signal output of AND gate 58 on lead LL sets F/F 57 to provide an output signal S57 at its "1" output as illustrated in FIG. 4 and at the same time to remove a "1" signal from its reset "0" output to inhibit AND gate 58 from producing another "1" output signal on lead LL at this time in response to the next succeeding output of differentiating circuit 55. This inhibiting of AND gate 58 prevents a double sensing of the "0" to "1" transition in the bottom row of the shift register at the left-hand edge of the segment scanned in the left-hand-to-right-hand direction.

In response to a "1" to "0" transition as sensed at the output of OR gate 53, or in other words, in response to a negative polarity pulse at the output of differentiating circuit 55, such negative pulse is inverted via polarity inverter 550 into a positive polarity pulse. This positive pulse activates AND gate 551 to produce a "1" signal pulse on lead LR so long as F/F553 is in its reset state to provide a "1" signal at its "0" output terminal for enabling the latter AND gate. This sensing of the "1" to "0" transition indicates that the right-hand edge of the scanned character portion character (character "6" in FIGS. 1, 2 and 8) is detected for the first time in the course of the left-hand-to-right-hand scanning. The "1" signal on lead LR applied via delay line 552 sets F/F553 which thereupon removes the "1" signal from its "0" output whereby gate 551 is changed from the enabled to the inhibited state. This prevents a double sensing of the "1" to "0" transition in the bottom row of the shift register at the right-hand edge of the segment scanned in the left-hand-to-right-hand direction.

Similarly, in response to a "0" to "1" transition sensed in the output of OR gate 56, or in other words in response to a positive pulse in the output of differentiating circuit 56, AND gate 561 produces a "1" signal on its output lead RR so long as F/F566 is in the reset state to provide a "1" signal at its reset "0" terminal for enabling the latter AND gate. This indicates "0" terminal for enabling the latter AND gate. This indicates "0" to "1" transition is sensed for the first time in the right-hand-to-left-hand direction in the bottom row of the shift register. The "1" signal on lead RR via delay line 561*a* sets F/F566 which thereupon removes a "1" signal from its reset "0" output to inhibit AND gate 561 from producing another "1" signal on lead RR at this time in response to the next succeeding output of differentiating circuit 56. This inhibits AND gate 561 to preclude a dual sensing of the "0" to "1" transition at the right-hand edge of the segment scanned in the right-hand-to-left-hand direction. In a like manner, in response to a "1" to "0" transition in the output of OR gate 54, or in other words in response to a negative polarity pulse in the output of differentiating circuit 56, such negative pulse is inverted via polarity invertor 560 into a positive polarity pulse. This positive pulse stimulates AND gate 562 to produce a "1" signal on lead RL so long as F/F563 is in its reset state to provide a "1" signal at its "0" output terminal for enabling the latter AND gate. This indicates the left-hand edge of the scanned character portion (character "6" in FIGS. 1, 2 and 8) is detected for the first time in the course of the right-hand-to-left-hand scanning. The "1" signal on lead RL applied via delay line 562*a* sets F/F563 which thereupon removes the "1" signal from its reset "0" terminal to inhibit AND gate 562 from producing another "1" signal on lead RL at this time in response to the next succeeding output of differentiating circuit 56. This inhibits AND gate 562 to preclude a double sensing of the "1" to "0" transition at the left-hand edge of the segment scanned in the right-hand-to-left-hand direction.

At the end of each train of P1...P15 scanning pulses of the 18 scanning pulse trains required to scan or completely read out the numerical character "6" shown in FIG. 8 and stored in the "0" and "1" pattern in the shift register in FIGS. 1 and 2, it is understood that each such pulse P15 is simultaneously applied to AND gates 64 and 65. Therefore, under the condition where AND gate 58 never provides a "1" signal on lead LL and F/F57 is in the reset state, the pulse P15 via AND gate 64 resets F/F69. On the other hand, a "1" signal on lead LL sets F/F57 whereby the "1" signal at its "1" output terminal together with pulse P15 via AND gate 65 sets F/F69. The scanned bottom row of the shift register is thus detected. Following this operation of FIG. 2, a delayed DP15 pulse (delayed on delay line 63) simultaneously resets F/F*s* 57,553,563 and 566 in preparation for the scanning of the bottom row of the shift register by the next succeeding train of pulses P1...P15. It is thus understood that a reset F/F69 indicates the absence of a portion (i.e., of the ink) of the scanned character "6" in the next-preceding scanned register row whereas a set F/F69 indicates the presence of a portion (i.e., of the ink) of the scanned character "6" in the next-preceding register row.

Referring to FIG. 2, it is seen therein that a circuit block 70 contains a pulse counter 74 which counts down each train of scanning pulses P1...P15 as supplied thereto via OR gate 66 from pulse source 40. This counter is reset by a "1" signal derived via sequential delay lines 84 and 86 from lead LL to count the timing pulses P1...P14 in successive pulse trains supplied through OR gate 66. At pulse counts of 11, 14 and 18, the corresponding output terminals 11, 14 and 18, respectively, of counter 74 provide "1" signals for setting F/F*s* 75, 76 and 77. Under the condition where a portion (i.e., the ink) of the scanned character is present in the next-preceding scanned bottom row of the shift register to set F/F69, the "1"

signal output of the latter flip-flop is applied as one input to AND gate 85 while the "1" signal on lead LL due to the scanning of the next succeeding register row is applied via delay line 84 as a second input to AND gate 85. The concomitant occurrence of the latter two input "1" signals activates AND gate 85 to produce a "1" signal in the output thereof.

The output of AND gate 85 and the set and reset outputs "1" and "0," respectively, of F/Fs 75, 76 and 77 are connected as several inputs of a diode matrix 83 whose several outputs are connected to the set terminals of F/Fs 78, 79, 80 and 81. The latter flip-flops have their reset terminals connected to the output of a delay line 87 whose input is connected to the output of another delay line 63. This provides pulse DP15 with two successive time delays whereby F/Fs 78, 79, 80 and 81 are simultaneously reset. The wiring of matrix 83 is so arranged that when AND gate 85 provides a "1" output signal and F/Fs 75, 76 and 77 are reset, then F/F78 is set to provide the output signal LLLJ; when AND gate 85 provides a "1" output signal and F/F75 is set while F/Fs 76 and 77 are reset, then F/F79 is set to provide an output signal LLLS; when AND gate 85 provides a "1" output signal and F/Fs 75 and 76 are set while F/F77 is reset, then F/F80 is set to provide an output signal LLRS: and when AND gate 85 provides a "1 " output signal and F/Fs 75, 76 and 77 are reset, then F/F81 is set to provide an output signal LLRJ. These latter alphabetically identified signals are utilized for purposes that are subsequently explained.

Referring to FIG. 5; a portion of shift register 3, for example, shown therein comprises a matrix having four rows R1...R4, each comprising 14 storage areas for "0" and "1" signals, or in other words, 14 columns of such signal storage areas. The obliquely hatched areas of the matrix indicate the storage of "1" signals while the blank areas indicate storage of "0" signals. A scanning of the matrix in FIG. 5 in a bottom-to-top direction in the order of R1...R4, and in a left-hand-to-right-hand direction serves to produce the signal R in FIG. 5. This signal includes a time point *a* indicating a "0" to "1" transition in row R1, a time point *b* indicating a "0" to "1" transition in row R2, time point *c* indicating first "0" to "1" transition in row R3, and a time point *d* indicating a "0" to "1" transition in row R4. The time points *a*, *b*, *c* and *d* indicate the time points of the first occurrences of the "0" to "1" transitions in the respective rows R1...R4. Each of the "0" to "1" transitions in each of the rows R1...R4 serves to produce a "1" signal on lead LL.

The "1" signal on lead LL at time point *a* in row R1 serves to reset counter 74 in FIG. 2 via the circuit previously traced. This counter then proceeds to count the P1...P14 scanning pulses in the next two pulse trains P1...P15 required to scan the two rows R1 and R2 until the "0" to "1" transition at time point *b* in row R2 produces the next "1" signal on lead LL. When the counter attains an 11-count, F/F75 is set; a 14-count, F/F76 is set, and an 18-count, F/F77 is set. In the instant description, however, only a 10-count is reached at time point *b* in row R2 whereby F/Fs 75, 76 and 77 are permitted to remain in the reset state. As a consequence, matrix 83 activated by the logical product of the "1" signal in the output and the "1" signals at the terminals O of F/Fs 75, 76 and 77 produce a "1" output signal to set F/F78 which then produces the output signal LLLJ as previously noted and shown as waveform S78 in FIG. 4.

In a similar manner, the "1" signal on lead LL at time point *c* in row R3 resets counter 74 and F/Fs 75, 76 and 77 whereupon this counter commences a new count which attains a 13-count at the latter time point *c* in row R3. Whereupon F/F75 is set and F/F76 and 77 remain reset. Now, matrix 83 responsive to a logical product of the "1" signals in the outputs AND gate 85, set F/F75 and reset F/Fs 76 and 77 produces a "1" output signal to set F/F79 which thereupon produces output signal LLLS above-mentioned and shown as waveform S79 in FIG. 4. In a like way, the "1" signal on lead LL at time point *d* in row R4 resets counter 74 and F/Fs 75, 76 and 77 so that the latter counter begins a new count which achieves a 19-count at the time point *d* whereby F/Fs 75, 76 and 77 are set. This count sets F/Fs 75, 76 and 77. Now, matrix 83 stimulated by the logical product of the "1" signals in the outputs of AND gate 85 and F/Fs 75, 76 and 77 produce a "1" output signal to set F/F81 which thereupon produces output signal LLRJ as hereinbefore identified and shown as waveform S81 in FIG. 4.

Figure 6A:
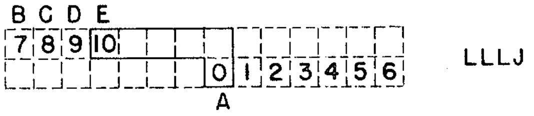

Edge tracer 7 in FIG. 2 is now additionally described with reference to FIGS. 6*a*—6*d*. FIG. 6*a* shows a case where a "0" to "1" transition took place in one of shift register stages B, C and D in row R2 of FIG. 5, each latter stage being in the left-hand side of shift register stage E. As this involves counter 74 producing a pulse count of less than an 11-count (actually a 10-count), F/Fs 75, 76 and 77 in FIG. 2 remain reset to cause set of F/F78 which produces the output signal LLLJ as previously noted. As clearly shown in FIG. 6*a*, the "0" to "1" transition may be effected in more-than-four register stages in the next succeeding row R2 in FIG. 5 serves to result in the production of the signal LLLJ thereby indicating an abrupt shifting of the "0" to "1" transition.

Figure 6B:
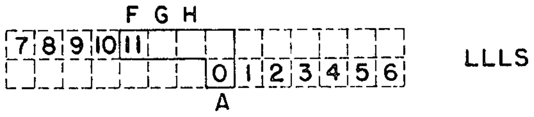

FIG. 6*b* illustrates a case where a "0" to "1" transition is effected in one of stages F, G and H. Since the count in counter 74 may lie between 11 and 13, F/F75 is set to set F/F79 which provides the output signal LLLS. This sensing of 0—3 stages for the "0" to "1" transition with next succeeding row R3 produces the latter signal LLLS. This shows that the segment of the character under readout at the moment has a left-hand extension in the row R3.

Figure 6C:
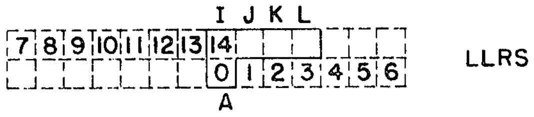

FIG. 6*c* delineates a case where the "0" to "1" transition is achieved in one of shift register stages I, J, K and L. As the count in counter 74 falls between the range of 14 through 17, F/Fs 75 and 76 are set to set F/F80 which produces the output signal LLRS. Accordingly, when the left-hand edge of the character segment is moved in the right-hand direction by 0 through 3, the output LLRS is detected. This indicates there is a protrusion of the scanned character segment in the right-hand direction. This protrusion is not shown in FIG. 5.

Figure 6D:
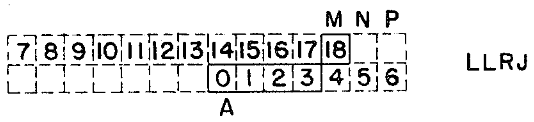

FIG. 6*d* shows the case where the "0" to "1" transition in one of shift register stages M, N and P. This signifies counter 74 has attained at least an 18-count whereupon F/Fs 75, 76 and 77 are set to set F/F81 for producing output signal LLRJ. This means that the "0" to "1" transition point in the next succeeding line is by four or more stages in the right-hand direction for causing the output signal LLRJ. This indicates an abrupt change in the scanned character segment in the next succeeding shift register row which is shown in row 4 in FIG. 5. Block 70 thus detects the left-hand edge of the character segment or stroke as hereinafter identified.

As blocks 71, 72 and 73 are the same in structure as that of block 70 in FIG. 2, details of the former blocks are omitted from the drawing for the purpose of simplicity. Briefly, block 71 serves to detect the right-hand edge of the scanned character segment. This is so because the "1" signal is provided on lead LR for the first "1" to "0" transition in the left-hand-to-right-hand scanning of the bottom row of the shift register in FIG. 2. It is understood that the above-described features of FIGS. 6*a*—6*b* apply to block 71. The "0" to "1" transition points sensed in the circuit of block 71 are classified in the following four categories:

Left-hand shift of four stages or more: LRLJ
Left-hand shift of 1—3 stages: LRLS
Right-hand shift of 0—3 stages: LRRS
Right-hand shift of four stages or more: LRRJ Similarly, block 72 is supplied with a "1" signal on lead RL at the time point of the first "1" to "0" transition observed in the right-hand-to-left-hand horizontal scanning of the register 3. This makes it possible to detect the left-hand edge of the scanned character segment. The shifts are classified into the following four categories:

Left-hand shift of four or more stages: RLLJ
Left-hand shift of 0—3 stages: RLLS
Right-hand shift of 0—3 stages: RLRS
Right-hand shift of four or more stages: RLRJ Block 73 is supplied with a "1" signal on lead RR when the first "0" to "1" transition is observed in the right-hand-to-left-hand horizontal scanning of the register 3. Therefore, the right-hand edge of the scanned character segment is detected. The shifts of this transition are classified into the following four categories:

Left-hand shift of four or more stages: RRLJ
Left-hand shift of 1—3 stages: RRLS
Right-hand shift of 0—3 stages: RRRS
Right-hand shift of four or more stages: RRRJ As it will be readily understood from the foregoing, if both of two adjacent rows have an intersection of a character stroke, shift patterns LLLJ, LLLS, LLRJ, and LLRS produced by block 70 and shift patterns RLLJ, RLLS, RLRJ, and RLLS produced by block 72 represent the manner of the shift of the same left-hand edge of the scanned character segment. Also, LRLJ, LRLS, LRRJ and LRRS obtained from block 71 and RRLJ, RRLS, RRRS and RRRJ obtained from block 73 represent the manner of shift of the same right-hand edge of the scanned character segment.

Figure 3:
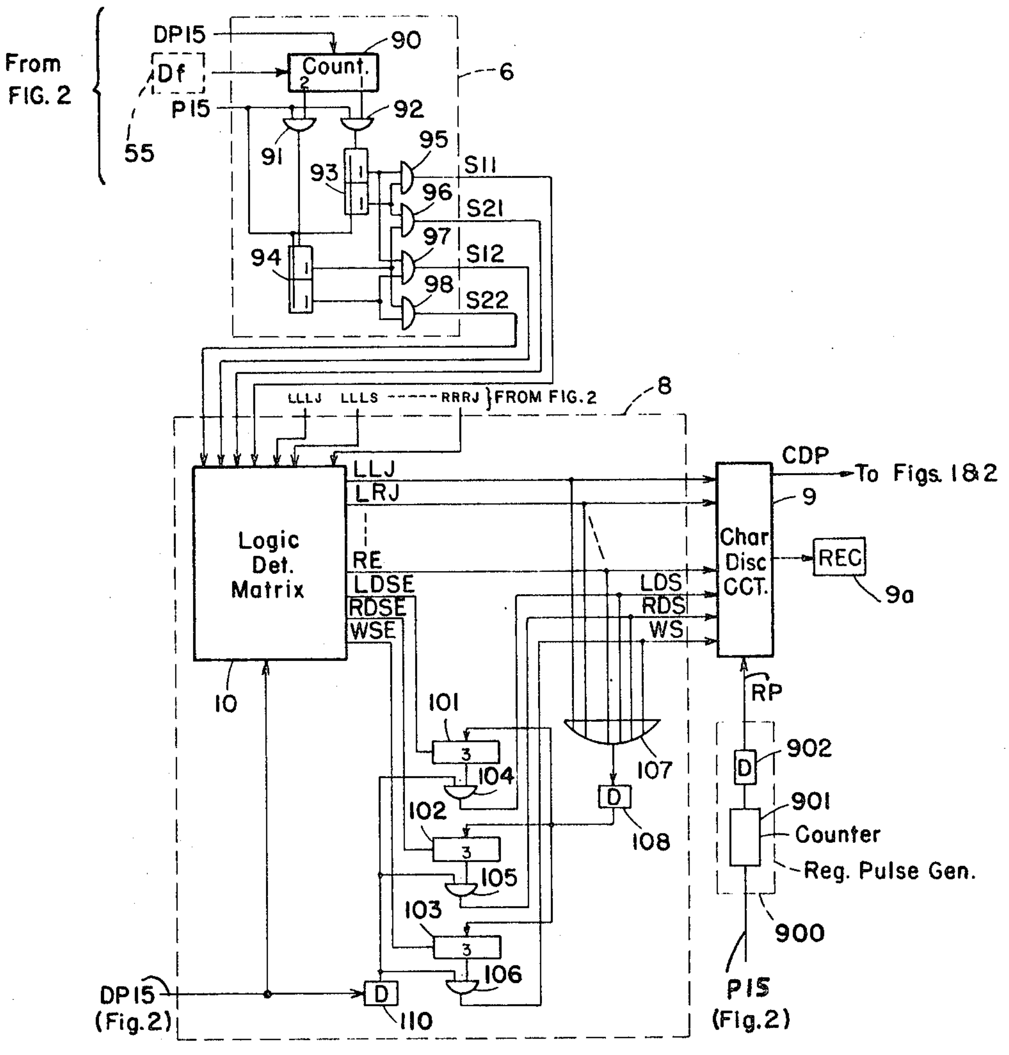

On the other hand, if two adjacent rows have both two intersections of character strokes, the output signals from blocks 70 and 71 represent the manner of shift of the left-hand and right-hand edges, respectively, of the extreme left stroke of the scanned character segment. Similarly, the output signals from block 72 and 73 represent the manner of shift of the left-hand and right-hand edges, respectively, of the extreme right-hand stroke of the scanned character segment. Character stroke counter 6 in FIG. 3 is now explained. Herein, the term character "stroke" is intended to mean the hatched area of the character segments shown in FIG. 5. The number of character strokes indicates the number of intersections of the character stroke in one row and is equal to the number of "0" to "1" transitions observed in the left-hand-to-right-hand horizontal scanning. A counter 90 of the character stroke counter is a 2-bit counter for counting the number of the occurrences of the "1" signal on lead LL as provided thereon by differentiating circuit 55 in FIG. 2. If there is only one stroke in one row, the counted number indicated by the counter 90 is 1. If there are two strokes, on the other hand, the counted number is 2. In response to the application of pulse P15 to AND gates 91 and 92 after the completion of the horizontal scanning by each train of pulses P1, P2,...P14, AND gate 92 produces a "1" output signal if the count of the counter 90 were 1. On the other hand, if the count of the counter 90 were 2, then AND gate 91 produces the "1" output signal.

The outputs of AND gates 91 and 92 are applied to the shift registers 94 and 93, respectively. Horizontal scanning of the next succeeding row in the shift register is performed by the next succeeding train of scanning pulses P1, P2,...P14, whereby the count of the counter 90 is determined by the number of the strokes in the latter row. Furthermore, upon the application of the output count of the counter 90 to the shift registers 93 and 94 as just mentioned, the information of the shift registers 93 and 94 are also shifted by one step, respectively. Delayed pulse DP15 serves to reset counter 90 to zero after the application of timing pulse P15 to AND gates 91 and 92 at the end of each scanning pulse train. Input terminals of AND gates 95, 96, 97 and 98 are cross-connected to output terminals of shift registers 93 and 94 to produce output signals S11, S21, S12 and S22 which indicate the following information:

S11: The number of character strokes is unity in one scanned row and also in the immediately preceding scanned row;

S21: the number of character strokes in the immediately preceding row is unity while that in the presently scanned row is two;

S12: the number of character strokes in the immediately preceding scanned row is two while that in presently scanned row is unity; and S22: the number of character strokes in the immediately preceding scanned row and in the presently scanned row is two in each row.

Feature detector 8 connected to the edge tracer 7 and the character stroke counter 6 is capable of detecting the features of the character strokes and the character segments. Matrix 10 included in the feature detector 8 comprises circuitry which produces LLJ, LRJ,...RE output patterns (FIG. 7), and output signals LDSE, RDSE and WSE in response to the outputs S11, S21, S12 and S22 of the character stroke counter 6. The physical meanings of the patterns shown in FIG. 7 are as follows:

LLJ: the left-hand shift of the left-hand edge is four or more shift register stages;

LRJ: the right-hand shift of the left-hand edge is four or more shift register stages;

RLJ: the left-hand shift of the right-hand edge is four or more shift register stages;

RRJ: the right-hand shift of the right-hand edge is four or more shift register stages;

T; the left-hand and right-hand shifts of the left-hand and right-hand edges, respectively, are four or more shift register stages;

M: two strokes of a character are joined;

S: one stroke of a character is divided into two;

LB: appearance of a new stroke of a character at the left-hand side;

LE: end of a character stroke that has been existent at the left-hand side;

RB: appearance of a new stroke of a character at the right-hand side;

RE: end of a character stroke that has been existent at the right-hand side;

LDS: left-hand ascending extension of one stroke of a character;

RDS: right-hand ascending extension of one stroke of a character;

WS: upward extension of two strokes of a character;

The relationship between LDSE and LDS, RDSE and RDS, WES and WS in FIG. 3 is explained below.

The logical operations in matrix 10 are as follows:

$LLJ=S_{11}\cdot LLLJ\cdot(LRLS+LRRS)$
$LRJ=S_{11}\cdot LLRJ\cdot(LRLS+LRRS)$
$RLJ=S_{11}\cdot(LLLS+LLRS)\cdot LRLJ$
$RRJ=S_{11}\cdot(LLLS+LLRS)\cdot LRRJ$
$T=S_{11}\cdot LLLJ\cdot LRRJ$
$M=S_{12}\cdot(LLLS+LLRS)\cdot LRRJ\cdot RLLJ\cdot(RRLS+RRRS)$
$S=S_{21}\cdot(LLLS+LLRS)\cdot LRLJ\cdot RLRJ\cdot(RRLS+RRRS)$
$LB=S_{21}\cdot LLLJ\cdot LRLJ\cdot(RLLS+RLRS)\cdot(RRLS+RRRS)$
$LE=S_{12}\cdot LLRJ\cdot LRRJ\cdot(RLLS+RLRS)\cdot(RRLS+RRRS)$
$RB=S_{21}\cdot(LLLS+LLRS)\cdot(LRLS+LRRS)\cdot RLRJ\cdot cRRRJ$
$RE=S_{12}\cdot(LLLS+LLRS)\cdot(LRLS+LRRS)\cdot RLLJ\cdot cRRLJ$ Additional operations in the detector 8 comprise the following: (1) four or more (LLJ, LRJ, RLJ and RRJ) stage shifts between the two adjacent shift register rows are sensed as an output applied immediately to the input of circuit 9 as a feature of the scanned character segment; (2) if the number of the strokes of a character is unity ($S_{11}$) with the edge of a character stroke shifting within three stages (LDSE, RDSE) and if this state is kept unchanged for three or more horizontal scanning periods, the features of the unidirectional shifts (LDS, RDS) are sensed in the circuit 9; (3) in the case where the number of character strokes is two ($S_{22}$) and is kept unchanged with the shift of the edge of character stroke limited within three stages (WSE) and if this state is kept as it is for three or more horizontal scanning periods, the feature (WS) of two vertical strokes of the character (WS) is sensed in the circuit 9. The structure of the latter circuit is identified hereinafter. Detailed explanations are given later herein regarding the above-mentioned cases (2) and (3).

Matrix 10 includes a circuit which makes it possible to establish the following logical operation in case there is no left-hand and right-hand shift of four or more stages of the left-hand and right-hand edges of the character stroke for producing the succeeding output signals:

$LDSE=S_{11}\cdot LLRS\cdot LRRS$...(0-3 stage left-hand shift of left-hand and right-hand edges);

$RDSE=S_{11}\cdot LLRS\cdot LRRS$...(0–stage right-hand shift of left-hand and right-hand edges); and $WSE=S_{22}\cdot(LLLS+LLRS)\cdot(LRLS+LRRS)\cdot(RLLS+RLRS)\cdot(RRLS\Gamma^{RRRS)...}$(0–stage right-hand or left-hand shift of two strokes of a character).

If each of the LDSE, RDSE or WSE signals is provided at the output of matrix 10 three times in succession, LDS, RDS and WS signals, respectively, are delivered to the input of discrimination circuit 9. More specifically, the signals LDSE, RDSE and WSE provided at the output of matrix 10 are applied to counters 101, 102 and 103, respectively. If a 3-count is recorded in each of counters 101, 102 and 103 at the time point where the pulse $DP_{15}$ is applied to AND gates 104, 105 and 106 via a delay circuit 110, then the output of the AND gates 104, 105 and 106 are respectively "1" signals to produce the LDS, RDS and WS signals as features of the scanned character segment. Upon detection of any one of the features LLJ, LRJ...RDS, WS the counters 101, 102 and 103 are reset by a "1" signal supplied through OR gate 107 and delay circuit 108 in sequence.

FIG. 8 shows an input numeral "6" viewed as a "0" and "1" pattern stored in the shift register 3 in FIG. 2 as previously mentioned. This numeral or character is divided into several character segments and features of each segment are sensed and encoded with regard to FIG. 8 as follows:

In the 3rd row: one stroke of the character is divided into two strokes (S);

In the 4th, 5th and 6th rows: two strokes of the character segments are detected three times and the result of detection is sent out at the 6th row (WS);

In the 7th and 8th rows: the counter 103 counts WSE pulses but does not send out the output;

In the 9th row: two separate strokes of the segment join each other into one stroke (M);

In the 11th row: the one stroke is redivided into two strokes (S);

In the 12th row: the right-hand side stroke (RE) ends;

In the 13th, 14th and 15th rows: a stroke extending toward the right-hand side is detected to turn out as output (RDS) at the 15th row; and In the 17th row: a four-stage or more right-hand extension is detected (RRJ).

The features S. WS, M....RRJ sensed in the circuit 8 as just mentioned are delivered in sequence to the discrimination of circuit 9.

The numerical characters 1, 2,...9, 0 are shown in FIG. 9 as embodying certain features of the segments illustrated in FIG. 7. Some of these features indicated at the right-hand side of each character in FIG. 7 are also indicated in FIG. 8. The discrimination circuit 9 embodies a plurality of discrete electric circuits related to corresponding features of the segments (shown in FIG. 7*a*) peculiar to each character shown in FIG. 9. With this stock of features used as references, the discrimination circuit 9 is activated by the respective "1" output signals provided by feature detector 8 to energize selectively certain ones of the electric circuits to represent the corresponding features of the scanned character 6 in FIGS. 1 and 2.

The discrimination circuit 9 may be composed, for example, of a logic circuit shown in "Character Recognition for Business Machines" (by M. H. Glauberman), Electronics, Feb. 1956. Alternatively, this circuit may be a sequential logic circuit shown in "An Asynchronous Character Recognition System and Device" (by Sakai, Nagao, Nagamori, Sekiguchi, Kiji), Proceedings of IFIP (International Federation of Information Processing) Congress, May 24—29, 1965. The discrimination circuit reads out the results of discrimination (i.e., the selectively energized circuits) into the receiver 9*a* for reproduction therein at the time point where the recognition command pulse RP is supplied to the discrimination circuit from the recognition pulse generator 900 in FIG. 3. Also, the discrimination circuit 9 applies the discrimination completion pulse CDP to the optical scanner 2 in FIGS. 1 and 2 every time one character discrimination cycle is completed.

Recognition pulse generator 900 comprises a counter 901 for counting the successive scanning pulses P15 supplied thereto from pulse generator 400 (FIG. 2) to produce the command pulse RP and a delay circuit 902 for delaying the command pulse RP to permit the selective energization of the necessary electric circuits in discrimination circuit 9. Therefore, the recognition command pulse RP is not generated until the time point when the "0" and "1" pattern of the scanned character stored in the shift register is completely subjected to the bidirectional horizontal scanning via scanning circuit 4 in FIG. 2.

As it will be understood from the foregoing, the discrimination circuit 9 requires a great many discrete, sequential electric circuits which must be equal in number at least to the number of kinds of characters to be read out. Depending on the variety of the handwritten and printed characters, more than one sequential circuit is preferably assigned to each character type. For example, since the numerals 7 and 3 illustrated in FIG. 10 are different in the character types, at least two separate sequential circuits are provided in the discrimination circuit 9. However, since the present invention relies for its character recognition on the fundamental features of character segments as shown in FIG. 7, it has a wide access to a variety of character types. For this reason, it is possible with the present invention to discriminate the characters even when they are handwritten as shown in FIGS. 9 and 10.

In the above description, the shift of the edge of a character stroke has been assumed, left-hand four-or-more stages, left-hand 1—3 stages, right-hand 0—3 stages and right-hand four-or-more stages. Also it is seen that while only the two-stroke character features are extracted according to the invention, it is obvious that they are assumed only for ease of the instant description. It is clear that finer classification of the edge shifts and greater number of the character strokes may be employed if so desired.

It is understood that the invention herein is described in specific respects for the purpose of this description. It is also understood that such respects are merely illustrative of the application of the invention. Numerous other arrangements may be devised by those skilled in the art without departing from the spirit and scope of the invention.

We claim:

1. A system for recognizing and reproducing a preselected character formed with a preselected color ink on a transparent background, comprising:

optical means for converting discrete portions of said character background and ink into "0" and "1" signals, respectively, and for producing a synchronizing signal;

a shift register comprising discrete areas arranged in rows and columns, each area common to one row and column, for storing said "0" 0"1" 1in a pattern;

logic means activated by said synchronizing signal to scan said areas in a bottom row of said register simultaneously in left-hand-to-right-hand and right-hand-to-left-hand directions for sensing "0" to "1" and "1" to "0" transitions therein to produce output "1" signals to represent left-hand and right-hand edges of successively scanned ink segments; said last-mentioned means shifting down said "0" and "1" signals in a next-to-the-bottom register row to replace said "0" and "1" signals then in said bottom rows while at the same time shifting down said "0" and "1" signals in all of the remaining register rows by one row at a time until all of said "0" and "1" signals remaining in said shift register are sensed in said shift register bottom row;

logic means counting said "1" signals due to said "0 " to "1"transitions in said register bottom row as sensed only in successive left-hand-to-right-hand scanning directions;

logic means activated by said left-hand and right-hand edge "1"signals and said counted "1" signals for producing successive signals representing particular features of successively scanned segments of said ink character;

discriminating circuit means including a plurality of groups of discrete electric circuits, each circuit group representing one of a plurality of typical segments of said scanned character; said circuits of each of said circuit groups selectively energized one at a time in response to said feature means successive output signals;

and receiving means activated by said energized circuits after all of said "0" and "1" signals stored in said shift register are sensed for reproducing said scanned character in terms of said "0" and "1" signal pattern stored in said last mentioned register.

2. The system according to claim 1, in which said scanning logic means includes an AND gate inhibited in response to first sensings of said "0" to "1" transitions as said shift register bottom row is scanned in left-hand-to-right-hand directions to represent said respective ink segment left-hand edges for preventing second sensings of said "0" to "1" transitions at said last-mentioned ink segment edges as ink segments are scanned in said last-mentioned directions.

3. The system according to claim 1, in which said scanning logic means includes an AND gate inhibited in response to first sensings of said "1" to "0" transitions as said shift register bottom row is scanned in left-hand-to-right-hand directions to represent said respective ink segment right-hand edges for preventing second sensings of said "1" to "0" transitions at said last-mentioned ink segment edges as said ink segments are scanned in said last-mentioned directions.

4. The system according to claim 1, in which said scanning logic means includes an AND gate inhibited in response to first sensings of said "0" to "1" transitions as said shift register bottom row is scanned in right-hand-to-left-hand directions to represent said respective ink segment right-hand edges for preventing second sensings of said "0" to "1" transitions at said last-mentioned edges as said ink segments are scanned in said last-mentioned directions.

5. The system according to claim 1 in which said scanning logic means includes an AND gate inhibited in response to first sensings of said "1" to "0" transitions as said shift register bottom row is scanned in right-hand-to-left-hand directions to represent said respective ink segment left-hand edges for preventing second sensings of said "1" to "0" transitions at said last-mentioned ink segment edges as said ink segments are scanned in said last-mentioned directions.

6. The system according to claim 1 in which said scanning logic means includes pulse generating means activated by said optical means synchronizing signal to generate trains of equally spaced timing pulses of which each train comprises certain pulses, equal in number to the number of said areas in each of said shift register rows, to scan said areas one at a time in said shift register bottom row simultaneously in said left-hand-to-right-hand and right-hand-to-left-hand directions for sensing said "0" to "1" and "1" to "0" transitions therein to produce said "1" signals; each of said pulse trains also comprising a last pulse actuating said shift register to shift down said "0" and "1" signals in said next-to-the-bottom row to replace said "0" and "1" signals then in said bottom row while at the same time shifting down said "0" and "1" signals in all of the remaining register rows one row at a time until all of said "0" and "1" signals remaining in said shift register are sensed in said shift register bottom row.

7. The system according to claim 2 in which said scanning logic means includes two OR gates for producing successive pairs of time-serial output binary signals in response to said simultaneous left-hand-to-right-hand and right-hand-to-left-hand directional scanning of said areas in said shift register bottom row for sensing said "0" to "1" and "1" to "0" transitions therein.

8. The system according to claim 7 which includes additional logic means activated by said OR gate output binary signals for producing said "1" signals to represent said left-hand and right-hand edges of said successively scanned segments.

9. The system according to claim 8 in which said counting means comprises:

a 2-bit counter for counting the number of said "0" to "1" transitions occurring in said shift register bottom row as representing said "0" and "1" transitions in said respective shift register rows as said shift register bottom row is scanned in said left-hand-to-right-hand direction; said last-mentioned counter activated to count 1 and 2 in response to one and two occurrences of said "0" to "1" transitions, respectively, in said last-mentioned bottom row;

and further logic means activated by one of said one and two count in said last-mentioned counter to produce further output "1" signals, each representing the number of "0" to "1" transitions in successively scanned ink segments of said character.

10. The system according to claim 9 in which said feature producing logic means is activated by said additional logic means output "1" signals and said further logic means further output "1" signals for producing said successive signals representing said particular features of said successively scanned ink segments.

11. The system according to claim 10 which includes supplementary means for counting said last timing pulses in successive scanning pulse trains to such number as required to scan said shift register bottom row until all of said "0" and "1" signals stored in said respective shift register rows are sensed to produce a recognition command pulse, whereby said discriminating means is stimulated to read out said energized circuits thereof to activate said receiving means.

12. A system for recognizing and reproducing a numerical character formed with a preselected color ink on a transparent background, comprising:

optical means for converting discrete portions of said character background and ink into "0" and "1" signals, respectively, and for producing a synchronizing signal;

a shift register comprising discrete areas arranged in rows and columns, each area common to one row and column, for storing said "0" and "1" signals in a pattern;

pulse generating means activated by said synchronizing signal for generating trains of scanning pulses of which each train includes certain pulses, equal in number to the number of said areas in each of said register rows, and a last pulse;

logic means activated by said certain pulses of successive scanning pulse trains to scan said areas one at a time in a bottom row of said register simultaneously in left-hand-to-right-hand and right-hand-to-left-hand directions for sensing "0" to "1" and "1" to "0" transitions therein to produce successive simultaneous pairs of time-serial binary output signals while thereafter said last pulses in said successive scanning pulse trains shift down said "0" and "1" signals in a next-to-the-bottom row to replace said "0" and "1" signals in said bottom row and at the same time shift down said "0" and "1" signals in the remaining rows of said register by one row at a time until said "0" and "1" signals in all of said register rows are sensed in said register bottom row;

OR gate logic means activated by discrete scanning pulses in said successive trains thereof for producing corresponding output signals;

logic edge tracer means activated by said scanning means binary output signals, said generating means pulse train last pulses and said OR gate means output signals for producing output signals to represent left-hand and right-hand edges of successively scanned ink segments of said character;

logic means counting "0" to "1" transitions in said register bottom row as sensed only in successive left-hand-to-right-hand directions for producing output signals representing the number of said latter transitions occurring in adjacent rows of said register as sensed in turn in said register bottom row;

logic means activated by said edge tracer means output signals and said counting means output signals for producing successive signals to represent particular features of successively scanned ink segments of said character;

discriminating circuit means including a plurality of groups of electric circuits, each circuit group representing one of a plurality of typical segments of said scanned ink character; said circuits of each of said circuit groups selectively energized one at a time in response to said feature means successive output signals;

supplementary counting means for counting said last pulses in successive scanning pulse trains to such number as required to scan said register bottom row until all of said "0"and "1" signals stored in said register pattern are sensed to produce a recognition command signal, whereby said discriminating circuit means is activated to read out said energized circuits therein;

and receiving means activated by said discriminating means energized circuits as read out therefrom for reproducing said scanned ink character in terms of said "0" and "1" signal pattern stored in said register.